United States Patent
Oshima et al.

(10) Patent No.: US 6,806,321 B2
(45) Date of Patent: Oct. 19, 2004

(54) PROCESS FOR PRODUCING MODIFIED POLYMER RUBBER

(75) Inventors: Mayumi Oshima, Ichihara (JP); Seiichi Mabe, Ichihara (JP); Katsunari Inagaki, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/391,619

(22) Filed: Mar. 20, 2003

(65) Prior Publication Data

US 2004/0054092 A1 Mar. 18, 2004

(30) Foreign Application Priority Data

Sep. 12, 2002 (JP) ........................................ 2002-266545

(51) Int. Cl.$^7$ ........................ C08F 36/04; C08L 19/00; C08K 5/07; C08K 5/16
(52) U.S. Cl. ................. 525/331.9; 525/250; 525/331.1; 526/258; 526/259; 526/260; 526/261; 526/262; 526/263; 526/264; 526/265
(58) Field of Search .......................... 525/331.9, 331.1, 525/250; 526/258, 259, 260, 261, 262, 263, 264, 265

(56) References Cited

U.S. PATENT DOCUMENTS

| | | | | |
|---|---|---|---|---|
| 3,244,664 A | * | 4/1966 | Zelinski et al. | ............. 525/236 |
| 4,535,052 A | * | 8/1985 | Anderson et al. | ........ 430/277.1 |

FOREIGN PATENT DOCUMENTS

| | | |
|---|---|---|
| EP | 0 334 042 B1 | 9/1989 |
| EP | 0 493 364 A2 | 7/1992 |
| JP | 5-46365 B2 | 7/1993 |
| JP | 5-202102 A | 8/1993 |
| JP | 2540901 B2 | 7/1996 |

\* cited by examiner

Primary Examiner—James J. Seidleck
Assistant Examiner—Olga Asinovsky
(74) Attorney, Agent, or Firm—Sughrue Mion, PLLC

(57) ABSTRACT

There is provided a process for producing a modified polymer rubber, which comprises the steps of:

(1) polymerizing a conjugated diene monomer, or the conjugated diene monomer and an aromatic vinyl monomer in the presence of an alkali metal catalyst in a hydrocarbon solvent to produce an active polymer having an alkali metal at its end(s), and (2) reacting the active polymer with a ketone compound represented by a specific formula to produce a modified polymer rubber.

3 Claims, No Drawings

PROCESS FOR PRODUCING MODIFIED POLYMER RUBBER

FIELD OF THE INVENTION

The present invention relates to a process for producing a modified polymer rubber having superior impact resilience, which modified polymer rubber is accordingly capable of producing motorcar tires having superior fuel cost saving.

BACKGROUND OF THE INVENTION

A styrene-butadiene copolymer obtained by emulsion polymerization is known as rubber used for motorcar tires. However, said copolymer has a problem that motorcar tires comprising said copolymer are not satisfactory from a view point of fuel cost saving, because the copolymer does not have sufficient impact resilience.

In order to obtain rubber having superior impact resilience, JP-B 5-46365 discloses a process, which comprises copolymerizing butadiene and styrene in a hydrocarbon solvent using an organolithium compound as an initiator, and a Lewis base such as ether as a microstructure controlling agent.

Further, Japanese Patent No. 2540901 proposes a process, which comprises reacting an alkali metal, which is bound at the end of a diene polymer rubber, with a specific acrylamide to obtain a modified diene polymer rubber having improved impact resilience.

However, recently, a level of a demand for fuel cost saving of motorcar tires is higher from an environmental view, and therefore, any of the above-mentioned copolymer rubbers can hardly meet such a demand.

SUMMARY OF THE INVENTION

An object of the present invention is to provide a process for producing a modified polymer rubber having superior impact resilience.

The present invention provides a process for producing a modified polymer rubber, which comprises the steps of:

(1) polymerizing a conjugated diene monomer, or the conjugated diene monomer and an aromatic vinyl monomer in the presence of an alkali metal catalyst in a hydrocarbon solvent to produce an active polymer having an alkali metal at its end(s), and (2) reacting the active polymer with a ketone compound represented by the following formula (1) to produce a modified polymer rubber,

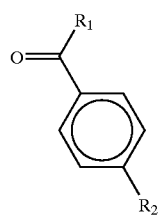

(1)

wherein $R_1$ is an alkyl group, an alkoxy group, a phenyl group or a benzyl group having 1 to 8 carbon atoms; and $R_2$ is an N-substituted cyclic amino group.

DETAILED DESCRIPTION OF THE INVENTION

Examples of a conjugated diene monomer used in the present invention are 1,3-butadiene, isoprene, 1,3-pentadiene (piperylene), 2,3-dimethyl-1,3-butadiene and 1,3-hexadiene. Of these, 1,3-butadiene or isoprene is preferable from a viewpoint of availability and physical properties of a modified polymer rubber obtained.

Examples of an aromatic vinyl monomer used in the present invention are styrene, α-methylstyrene, vinyltoluene, vinylnaphthalene, divinylbenzene, trivinylbenzene and divinylnaphthalene. Of these, styrene is preferable from a viewpoint of availability and physical properties of a modified polymer rubber obtained.

A hydrocarbon solvent used in the present invention comprises those solvents, which do not deactivate an alkali metal catalyst. Preferable examples thereof are aliphatic hydrocarbons, aromatic hydrocarbons and alicyclic hydrocarbons. Particularly preferable examples thereof are those having 2 to 12 carbon atoms. Specific examples thereof are propane, n-butane, iso-butane, n-pentane, iso-pentane, n-hexane, cyclohexane, propene, 1-butene, iso-butene, trans-2-butene, cis-2-butene, 1-pentene, 2-pentene, 1-hexene, 2-hexene, benzene, toluene, xylene and ethylbenzene, and a combination of at least two thereof.

Examples of an alkali metal catalyst used in the present invention are metals such as lithium, sodium, potassium, rubidium and cesium; hydrocarbon compounds containing such metals; and complexes of such metals with polar compounds. Among them, preferable are lithium compounds or sodium compounds having 2 to 20 carbon atoms.

Examples of the alkali metal catalyst are ethyllithium, n-propyllithium, iso-propyllithium, n-butyllithium, sec-butyllithium, t-octyllithium, n-decyllithium, phenyllithium, 2-naphthyllithium, 2-butyl-phenyllithium, 4-phenyl-butyllithium, cyclohexyllithium, 4-cyclopentyllithium, 1,4-dilithio-butene-2, sodium naphthalene, sodium biphenyl, potassium-tetrahydrofuran complex, potassium diethoxy-ethane complex, and a sodium salt of α-methylstyrene tetramer.

In the above formula (1), a preferable $R_1$ is a methyl group, an ethyl group, a propyl group, a butyl group, a methoxy group, an ethoxy group, a propoxy group, a butoxy group, a phenyl group or a benzyl group. Examples of $R_2$ in the formula are derivatives of nitrogen element-carrying heterocyclic compounds such as morpholine, imidazoline, imidazole, pyrazole, oxazine, thiazine, oxazole, thiazole, pyridine, pyrimidine and pyrazine derivatives. Among them, preferable $R_2$ is a morpholino group or an imidazole group.

Examples of a ketone compound used in the present invention are 4-morpholinoacetophenone, 4-morpholinobenzophenone, 4'-(imidazol-1-yl)acetophenone, 4'-(imidazol-1-yl)benzophenone, 4-pyrazolylacetophene and 4-pyrazolylbenzophene. Among them, preferable is 4-morpholinobenzophenone, 4-morpholinoacetophenone or 4'-(imidazol-1-yl)acetophenone from a viewpoint of remarkable fuel cost saving.

When using a combination of the conjugated diene monomer with the aromatic vinyl monomer in the present invention, a weight ratio of conjugated diene monomer/aromatic vinyl monomer is preferably from 50/50 to 90/10, and more preferably from 55/45 to 85/15. When the ratio is less than 50/50, a modified polymer rubber obtained may be insoluble in the hydrocarbon solvent, and as a result, it may be impossible to carry out a homogeneous polymerization. When the ratio exceeds 90/10, strength of a modified polymer rubber obtained may decrease.

The conjugated diene monomer or the aromatic vinyl monomer used in the present invention may be combined with randomizers and/or compounds for controlling a content of a vinyl bond derived from the conjugated diene monomer. A polymerization method in the present invention is not particularly limited.

As the above-mentioned compounds for controlling a content of a vinyl bond, Lewis basic compounds are exemplified. As said compounds, an ether or a tertiary amine is preferable from a viewpoint of industrial availability.

Examples of the above-mentioned ethers are cyclic ethers such as tetrahydrofuran, tetrahydropyran and 1,4-dioxane; aliphatic mono ethers such as diethyl ether and dibutyl ether; aliphatic diethers such as ethylene glycol dimethyl ether, ethylene glycol diethyl ether, ethylene glycol dibutyl ether, diethylene glycol diethyl ether and diethylene glycol dibutyl ether; and aromatic ethers such as diphenyl ether and anisole.

Examples of the above-mentioned tertiary amines are triethylamine, tripropylamine, tributylamine, N,N,N',N'-tetramethylethylenediamine, N,N-diethylaniline, pyridine and quinoline.

An amount of the ketone compound used is usually from 0.1 to 10 mol, and preferably from 0.5 to 2 mol, per 1 mol of the alkali metal catalyst. When the amount is less than 0.1 mol, an improving effect of fuel cost saving may be small. When the amount exceeds 10 mol, the unreacted ketone compound remains in the solvent, and it is not recommendable from an economical point of view, because an additional step of separating the ketone compound from the solvent is required in order to recycle and reuse the solvent.

A reaction between the ketone compound and the active polymer proceeds rapidly. A reaction temperature and a reaction time of said reaction are not limited. The reaction temperature is generally from ambient temperature to 80° C., and a reaction time is generally from several seconds to several hours. As a preferable contacting method between the ketone compound and the active polymer, there is exemplified a method comprising the step of adding the ketone compound into the polymerization reaction mixture obtained in the step 1.

From a viewpoint of kneading processability of the modified polymer rubber obtained, it is preferable to add a coupling agent represented by the following formula to the active polymer prior to or after the reaction between the ketone compound and the active polymer,

$$R_aMX_{4-a}$$

wherein R is an alkyl group, an alkenyl group, a cycloalkenyl group or an aromatic hydrocarbon group; M is a silicon or tin atom; X is a halogen atom; and a is an integer of from 0 to 2.

An amount of the above-mentioned coupling agent added is usually from 0.03 to 0.4 mol, and preferably from 0.05 to 0.3 mol, per 1 mol of the alkali metal catalyst. When the amount is less than 0.03 mol, an improving effect of processability of the modified polymer rubber may be small. When the amount exceeds 0.4 mol, a proportion of the active polymer participating in the reaction with the ketone compound decrease, so that an improving effect of fuel cost saving may decrease.

The modified polymer rubber contained in the reaction mixture obtained in the step 2 can be solidified according to a solidifying method, which is usually carried out in a production of rubber by solution polymerization, such as (1) a method comprising the step of adding a coagulant and (2) a method comprising the step of adding steam. A solidifying temperature is not particularly limited.

The solidified modified polymer rubber can be dried with a drier such as a band drier and an extrusion type drier, which are commonly employed in a synthetic rubber production. A drying temperature is not particularly limited.

Mooney viscosity ($ML_{1+4}$) of the obtained modified polymer rubber is preferably from 10 to 200, and more preferably from 20 to 150. When the Mooney viscosity is less than 10, mechanical properties such as tensile strength of vulcanized rubber thereof may decrease. When the Mooney viscosity exceeds 200, miscibility when blending said modified polymer rubber with the other rubber to produce a rubber composition may be so poor that it is difficult to produce said rubber composition, and as a result, mechanical properties of a vulcanized rubber composition thereof may decrease.

A content of the vinyl bond (which bond is derived from the conjugated diene monomer) contained in the obtained modified polymer rubber is preferably from 10 to 70%, and more preferably from 15 to 60%. When the content is less than 10%, a glass transition temperature of the modified polymer rubber obtained may be lowered to deteriorate a grip performance of motorcar tires composed of the modified polymer rubber. When the content exceeds 70%, a glass transition temperature of the modified polymer rubber obtained may be elevated to deteriorate the impact resilience of the modified polymer rubber.

The obtained modified polymer rubber may be used in combination with other components such as other rubbers and various additives to produce a rubber composition.

Examples of the above-mentioned other rubber are styrene-butadiene copolymer rubber obtained by emulsion polymerization; polybutadiene rubber, butadiene-isoprene copolymer rubber and styrene-butadiene copolymer rubber obtained by solution polymerization using catalysts such as an anion polymerization catalyst and a ziegler type catalyst; natural rubber; and a combination of at least two thereof.

As to the rubber composition comprising the other rubber and the modified polymer rubber, a proportion of the latter rubber is preferably not less than 10% by weight, and more preferably not less than 20% by weight, based on 100% by weight of a total weight of both rubbers. When the proportion is less than 10% by weight, the impact resilience of the rubber composition obtained may hardly be improved, and also processability thereof is not good.

A kind and an amount of the above-mentioned additives can be determined depending upon purposes of using the rubber composition obtained. Examples of the additives usually employed in a rubber industry are vulcanizing agents such as sulfur; stearic acid; zinc white; thiazol type vulcanization accelerators; vulcanization accelerators such as thiuram type vulcaniztion accelerators and sulfenamide type vulcanization accelerators; organic peroxides; reinforcing agents such as carbon black of HAF and ISAF grades; fillers such as silica, calcium carbonate and talc; extender oils; processing coagents; and antioxidants. An amount of carbon black or silica added is preferably 10 to 150 parts by weight based on 100 parts by weight of an amount of the modified polymer rubber, or based on 100 parts by weight of a total amount of the modified polymer rubber and the other rubber. When said amount is less than 10 parts by weight, a reinforcing effect to the rubber component is not sufficient, and said amount exceeds 150 parts by weight, elongation of the obtained rubber composition may decrease.

A process for producing the above-mentioned rubber composition is not limited. An example thereof is a process comprising the step of mixing respective components with use of a known mixer such as a roll and a Bambury mixer.

The resulting rubber composition is usually vulcanized, and is used as a vulcanized rubber composition.

Since the modified polymer rubber obtained by the process in accordance with the present invention is superior in impact resilience and processability, a rubber composition comprising said rubber is most suitable for motorcar tires having superior fuel cost saving. Said rubber composition can be also employed for uses such as the sole of a shoe, floor materials and rubber vibration insulators.

EXAMPLE

The present invention is explained with reference to the following Examples, which are not intended to limit the scope of the present invention.

Example 1

A 20 liter-inner volume stainless steel polymerization reactor was washed and dried, and thereafter purged with dry nitrogen. Successively, 1420 g of 1,3-butadiene, 580 g of styrene, 122 g of tetrahydrofuran, 10.2 kg of hexane and a n-hexane solution containing 10.3 mmol of n-butyllithium were introduced therein, and polymerization was carried out at 65° C. for 3 hours under stirring to obtain a polymerization mixture.

To the obtained polymerization mixture, 10.3 mmol of 4-morpholinobenzophenone was added, and reaction was continued for 60 minutes at 65° C. under stirring. To the obtained reaction mixture, 10 ml of methanol was added, and stirring was further continued at 65° C. for 5 minutes to obtain a polymerization mixture.

The obtained reaction mixture was taken out and mixed with 10 g of 2,6-di-t-butyl-p-cresol, a trade name of SUMILIZER BHT, manufactured by Sumitomo Chemical Co., Ltd. Thereafter, most of hexane was evaporated, and successively the remainder was dried under reduced pressure at 55° C. for 12 hours, thereby obtaining a modified polymer rubber.

Example 2

A 20 liter-inner volume stainless steel polymerization reactor was washed and dried, and thereafter purged with dry nitrogen. Successively, 1560 g of 1,3-butadiene, 440 g of styrene, 10.8 g of tetrahydrofuran, 12.2 g of ethylene glycol dibutyl ether, 10.2 kg of hexane and a cyclohexane solution containing 9.55 mmol of n-butyllithium were introduced therein, and polymerization was carried out at 65° C. for 3 hours under stirring to obtain a polymerization mixture.

To the obtained polymerization mixture, 0.57 mmol of stannic chloride ($SnCl_4$: coupling agent) was added to effect a coupling reaction; 7.27 mmol of 4-morpholinobenzophenone was further added; and reaction was continued for 60 minutes at 65° C. under stirring. To the obtained reaction mixture, 10 ml of methanol was added, and stirring was further continued at 65° C. for 5 minutes to obtain a polymerization mixture.

The obtained reaction mixture was taken out and mixed with 10 g of 2,6-di-t-butyl-p-cresol mentioned in Example 1. Thereafter, most of hexane was evaporated, and successively the remainder was dried under reduced pressure at 55° C. for 12 hours, thereby obtaining a modified polymer rubber.

Example 3

Example 2 was repeated to obtain a modified polymer rubber except that 7.27 mmol of 4-morpholinobenzophenone was changed to 7.27 mmol of 4-morpholinoacetophenone.

Example 4

Example 1 was repeated to obtain a modified polymer rubber except that 10.1 mmol of n-butyllithium (n-hexane solution) was added, and 10.3 mmol of 4-morpholinobenzophenone was changed to 10.1 mmol of 4'-(imidazol-1-yl)acetophenone.

Comparative Example 1

Example 1 was repeated to obtain a polymer rubber except that 11.1 mmol of n-butyllithium (n-hexane solution) was added, and 4-morpholinobenzophenone was not added (therefore, reaction for 60 minutes at 65° C. under stirring was not carried out).

The following measurements were carried out regarding the modified polymer rubbers obtained Examples 1 to 4 and the polymer rubber obtained in Comparative Example 1. Results are shown in Table 2.

1. Mooney Viscosity

It was measured at 100° C. according to JIS K-6300.

2. Content of Vinyl Group

It was measured according to infrared spectroscopic analysis.

3. Content of Styrene Unit

It was measured according to refractive index method.

4. Impact Resilience of Cured Rubber

The modified polymer rubber or the polymer rubber and components shown in Table 1 were kneaded with one another using a plastomil for laboratory use, and the kneaded product was molded using a 6-inch roll, thereby obtaining a sheet. The sheet was heated at 160° C. for 45 minutes to be cured, and thereafter a 60° C. impact resilience of the cured sheet was measured using Luepke resilience tester.

TABLE 1

| Components | Proportion (part by weight) |
| --- | --- |
| (Modified) polymer rubber | 100 |
| Silica (Note 1) | 78.4 |
| Silane coupling agent (Note 2) | 6.4 |
| Carbon | 6.4 |
| Extender oil (Note 3) | 47.6 |
| Antioxidant (Note 4) | 1.5 |
| Zinc white | 2 |
| Vulcanization accelerator (note 5) | 1 |
| Vulcanization accelerator (Note 6) | 1 |
| Wax (Note 7) | 1.5 |
| Sulfur | 1.4 |

Note 1:
Trademark of ULTRASIL VN3-G, manufactured by Degussa.
Note 2:
Si69 manufactured by Deggusa.
Note 3:
Aroma oil, trademark of X-140, manufactured by Kyodo Oil Co., Ltd.
Note 4:
Antioxidant, trademark of ANTIGEN 3C, manufactured by Sumitomo Chemical Co., Ltd.
Note 5:
Vulcanization accelerator, trademark of SOXINOL CZ, manufactured by Sumitomo Chemical Co., Ltd.
Note 6:
Vulcanization accelerator, trademark of SOXINOL D, manufactured by Sumitomo Chemical Co., Ltd.
Note 7:
Trademark of SUNNOC N, manufactured by Ouchishinko Chemical Industrial Co., Ltd.

TABLE 2

|  | Example | | | | Comparative Example |
|---|---|---|---|---|---|
|  | 1 | 2 | 3 | 4 | 1 |
| Modifier (Note) | A | A | B | C | — |
| Styrene unit content (wt %) | 29 | 22 | 22 | 29 | 29 |
| Vinyl content (wt %) | 42 | 58 | 59 | 42 | 42 |
| Mooney viscosity (ML$_{1+4}$100° C.) | 54 | 71 | 81 | 67 | 52 |
| Coupling (%) | 0 | 26 | 27 | 0 | 0 |
| Impact resilience (60° C.) (%) | 54 | 53 | 54 | 55 | 51 |

Note
A: 4-morpholinobenzophenone
B: 4-morpholinoacetophenone
C: 4'-(imidazol-1-yl)acetophenone

What is claimed is:

1. A process for producing a modified polymer rubber, which comprises the steps of:

(1) polymerizing a conjugated diene monomer, or the conjugated diene monomer and an aromatic vinyl monomer in the presence of an alkali metal catalyst in a hydrocarbon solvent to produce an active polymer having an alkali metal at its end(s), and (2) reacting the active polymer with a ketone compound represented by the following formula (1) to produce a modified polymer rubber,

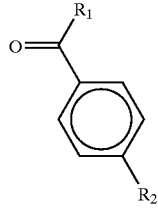

(1)

wherein $R_1$ is an alkyl group, an alkoxy group, a phenyl group or a benzyl group having 1 to 8 carbon atoms; and $R_2$ is an N-substituted cyclic amino group.

2. The process for producing a modified polymer rubber according to claim 1, wherein $R_1$ is a methyl group, an ethyl group, a propyl group, a butyl group, a methoxy group, an ethoxy group, a propoxy group, a butoxy group, a phenyl group or a benzyl group.

3. The process for producing a modified polymer rubber according to claim 1, wherein $R_2$ is a morpholino group or an imidazole group.

* * * * *